(12) United States Patent
Groddeck et al.

(10) Patent No.: US 7,469,778 B2
(45) Date of Patent: Dec. 30, 2008

(54) DRIVE UNIT FOR A HYBRID MOTOR VEHICLE

(75) Inventors: Michael Groddeck, Meckenbeuren (DE); Joachim Huster, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 337 days.

(21) Appl. No.: 11/362,581

(22) Filed: Feb. 24, 2006

(65) Prior Publication Data

US 2006/0196748 A1     Sep. 7, 2006

(30) Foreign Application Priority Data

Mar. 2, 2005    (DE) .................. 10 2005 009 447

(51) Int. Cl.
*B60K 6/20*      (2007.10)
*B60K 6/383*     (2007.10)
*B60K 6/387*     (2007.10)
*F16D 47/04*     (2006.01)

(52) U.S. Cl. .............. 192/48.3; 180/65.2; 192/48.92; 192/104 C; 192/207; 903/913; 903/946

(58) Field of Classification Search .............. 290/27
See application file for complete search history.

(56) References Cited

U.S. PATENT DOCUMENTS

| | | | | |
|---|---|---|---|---|
| 5,931,271 | A | * | 8/1999 | Haka ............... 192/48.92 |
| 2003/0078135 | A1 | | 4/2003 | Yang |
| 2003/0224903 | A1 | * | 12/2003 | Kitamura et al. ....... 477/5 |

FOREIGN PATENT DOCUMENTS

DE             43 23 601          1/1995

* cited by examiner

*Primary Examiner*—Rodney H Bonck
(74) *Attorney, Agent, or Firm*—Klaus J. Bach

(57) ABSTRACT

In a drive unit for a hybrid motor vehicle for coupling an internal combustion engine and/or a motor-generator to a transmission, wherein an input shaft of the drive unit is connected to the internal combustion engine and the motor-generator is connected to an output shaft of the drive unit and a clutch is arranged between the input shaft and the output shaft, the clutch is normally engaged and means are provided for opening the clutch depending on the speed of the output shaft and also a freewheeling coupling is arranged in the drive unit in parallel with the clutch for connecting the input shaft to the output shaft via the freewheeling coupling.

6 Claims, 5 Drawing Sheets

DRIVE UNIT FOR A HYBRID MOTOR VEHICLE

BACKGROUND OF THE INVENTION

The invention relates to a drive unit for a hybrid motor vehicle which drive unit is disposed between an internal combustion engine and a transmission for transmitting power from the drive motor to the transmission.

DE 43 23 601 A1 discloses a drive unit for a hybrid motor vehicle which includes an input shaft, a single-disc dry clutch, an output shaft and a starter-generator structure. The input shaft is driven by the internal combustion engine. Within the drive unit, the input shaft is connected to the primary side of the clutch. The output shaft extends to the transmission. Within the drive unit, the output shaft is connected to the secondary side of the clutch and to the starter-generator. When the clutch is engaged or closed, a power transmission path is established from the internal combustion engine via the input shaft and the clutch to the output shaft. The shift state of the clutch is determined by a disengagement rod, a throw-out bearing and an engagement spring effective in an axial direction. During electric motor operation, the clutch is deactivated in order to disconnect the internal combustion engine from the motor-generator. To this end, the engagement spring is held by a disengagement rod in its open position that is, a relatively high force which is effective over a desired period must be provided via the disengagement rod and the throw-out bearing. No safety device is shown which, upon failure of an auxiliary power supply, keeps the clutch open during operation of the vehicle by the electric motor.

It is the object of the present invention to improve the operational safety of the drive unit.

SUMMARY OF THE INVENTION

In a drive unit for a hybrid motor vehicle for coupling an internal combustion engine and/or a motor-generator to a transmission, wherein an input shaft of the drive unit is connected to the internal combustion engine and the motor-generator is connected to an output shaft of the drive unit and a clutch is arranged between the input shaft and the output shaft, which clutch is normally engaged while means are provided for opening the clutch depending on the speed of the output shaft, also a freewheeling coupling is arranged in the drive unit in parallel with the clutch for coupling the input shaft to the input shaft via the freewheeling coupling.

The clutch is a centrifugal clutch which when closed locks the freewheeling coupling. The clutch comprises friction shoes for the frictional interconnection of the input shaft and the output shaft. Centrifugal weights generate the force for establishing the frictional engagement of the friction shoes Also springs are provided for applying a spring force to the friction shoes. The friction shoes, the centrifugal weights and the springs are connected to the output shaft for rotation therewith whereby the speed dependency is established. The forces generated by the centrifugal weights are transmitted via a finger to the respective friction pads in such a way that, with a rotational speed of the output shaft above a limit value, for example, 500 rpm, the frictional engagement between the friction pads and the input shaft is eliminated.

In a particular embodiment of the invention, the clutch, that is, the friction shoes, the centrifugal weights and the springs are arranged around the input shaft. The springs act on the friction shoes in a centripetal direction. Alternatively, the clutch may be disposed within the input shaft and the springs act on the friction pads in a radially outward direction.

For suppressing torsional vibrations a metal-elastic coupling may be provided between the rotor of the motor-generator and the input shaft, for example, a "Geislinger" coupling.

In this embodiment, the freewheeling structure is supported between the input shaft and the elastic metal coupling.

In the drive unit according to the invention exclusively passive elements are used for the control of the transition between the various modes of operation. Operating media such as hydraulic fluids are not required. As a result of the use of passive components, the drive unit is very robust and operationally safe.

During operation of the internal combustion engine, the torque provided by the internal combustion engine is transmitted exclusively via the freewheeling coupling. Only during startup of the internal combustion engine by means of the starter generator is a torque transmitted by way of the clutch. However, the starter torque is substantially smaller than the maximum torque supplied by the engine. The clutch can therefore be relatively small and requires only little space. For the drive unit according to the invention standard components can be used.

The invention will be become more readily apparent from the following description on the basis of the accompanying drawings.

DESCRIPTION OF PREFERRED EMBODIMENTS

Figure 1:
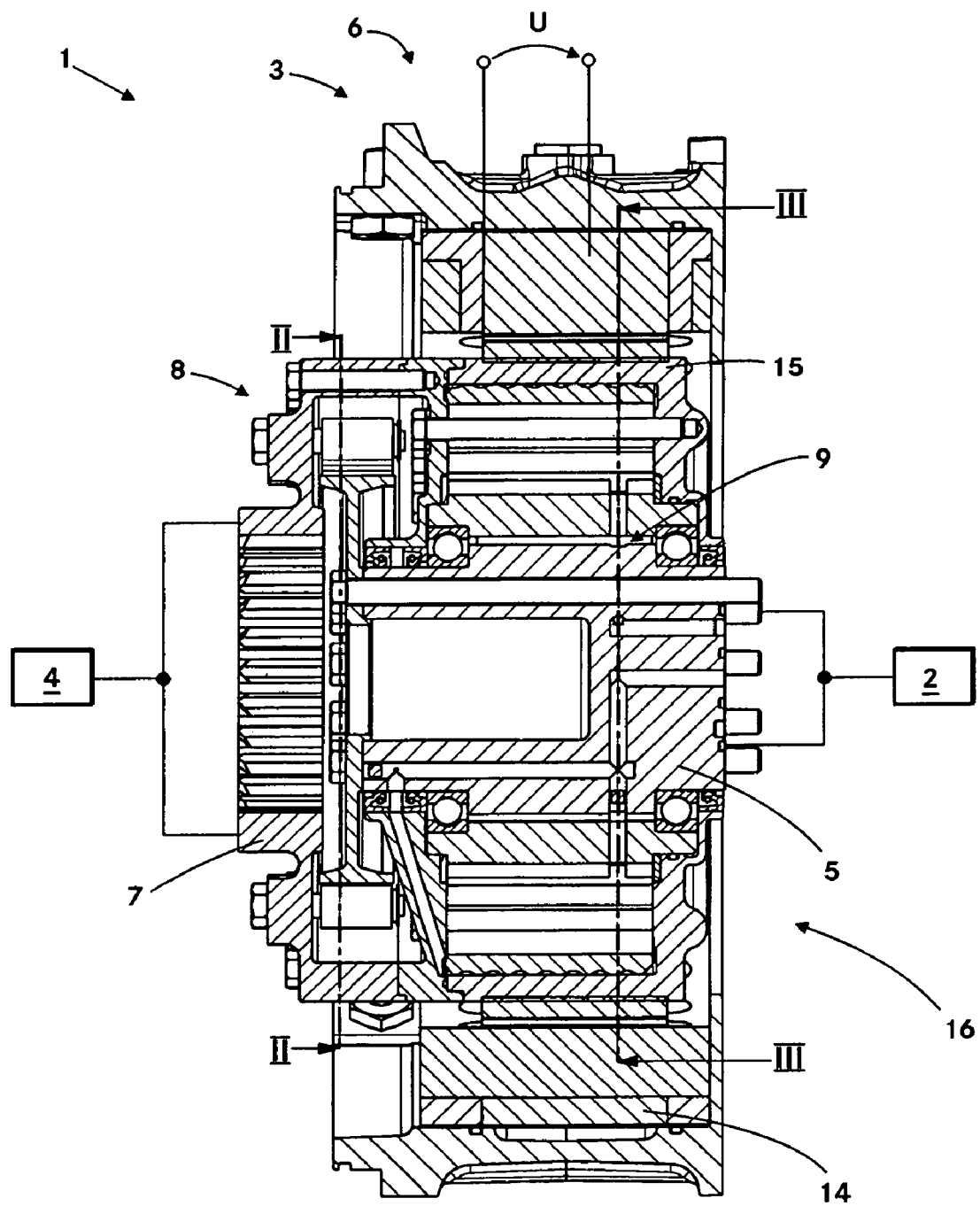
FIG. 1 shows a first embodiment of the drive unit according to the invention in a cross-sectional view.

FIG. 1 shows a drive unit 1 for a hybrid motor vehicle for coupling an internal combustion engine 2 and/or an electric motor 2 with a transmission 4. The drive unit 1 comprises the following components: an input shaft 5, a motor generator 6, an output shaft 7, a clutch 8 and a freewheeling coupling 9.

Figure 2:
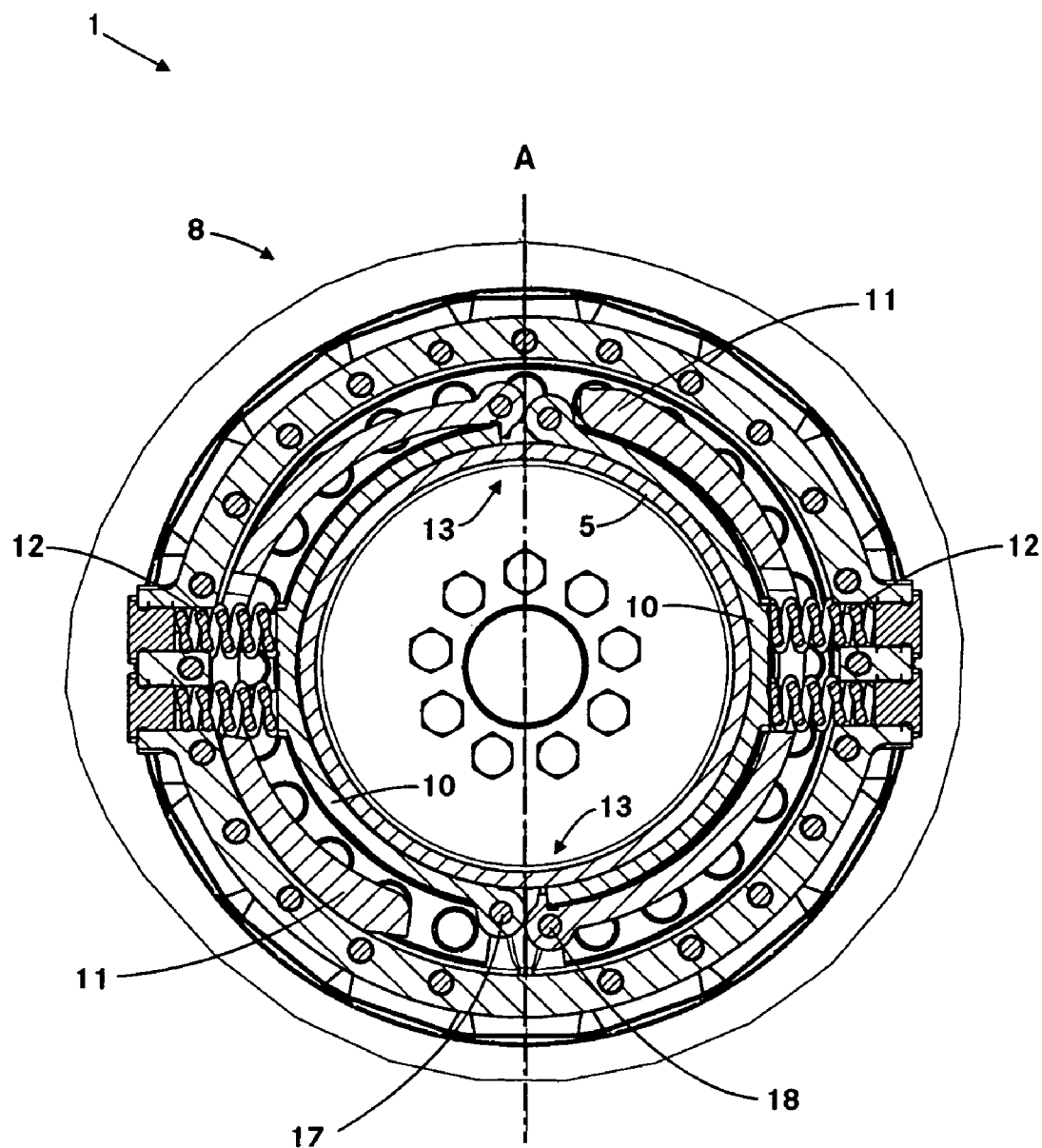
FIG. 2 is a cross-sectional view taken along line II-II of FIG. 1.
Figure 3:
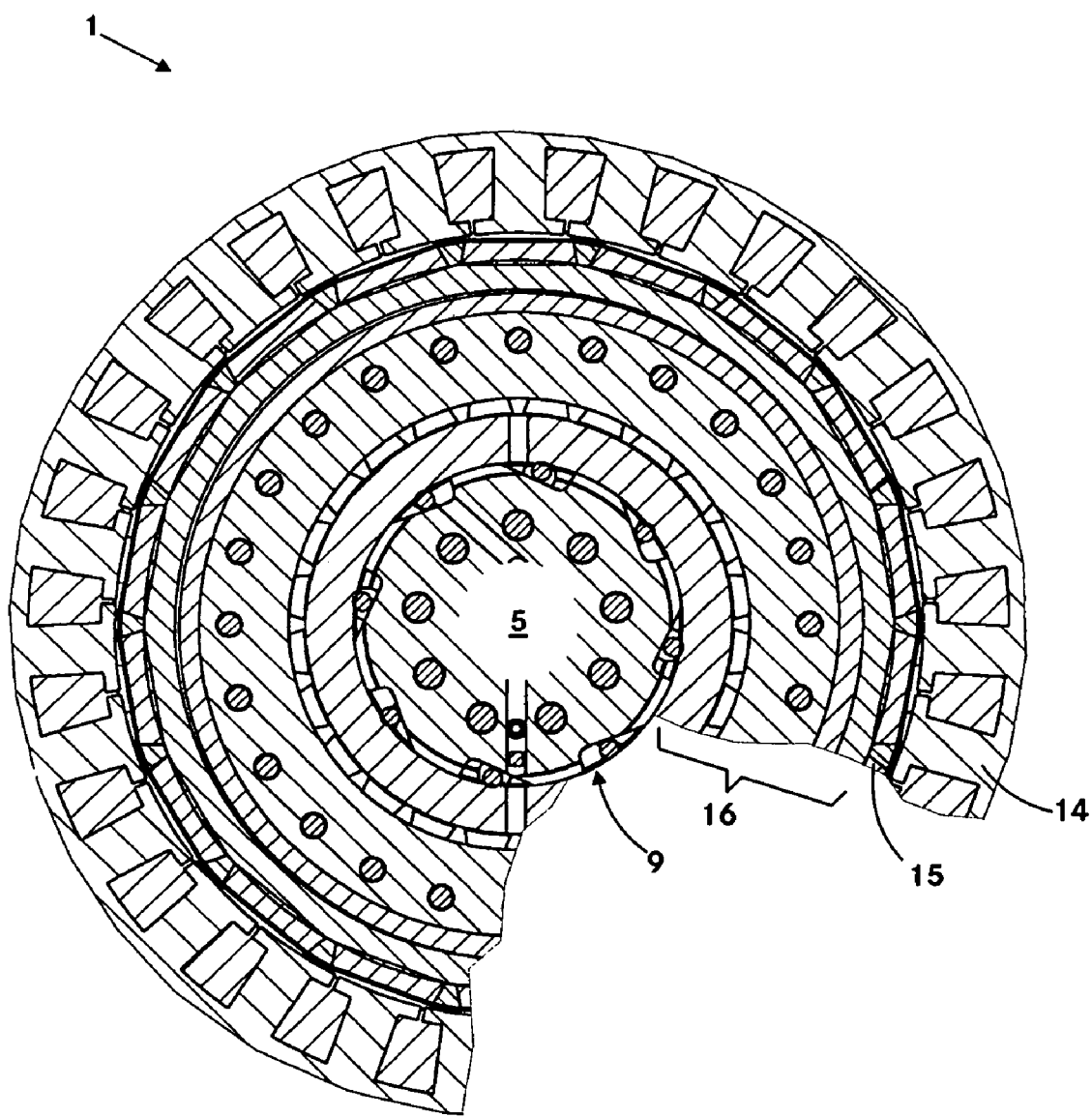
FIG. 3 is a cross-sectional view taken along line III-III of FIG. 1.

The input shaft 5 is firmly connected to the crankshaft of the internal combustion engine 2. The output shaft 7 is firmly connected for rotation with the transmission 4. The electrodynamic machine 3 comprises the motor generator 6 including a stationary stator or armature 14 and a rotor 15. If a voltage U is applied to the stator 14, the rotor 15 begins to rotate as a result of the electromagnetic coupling. The rotor 15 and the output shaft 7 are interconnected for rotation together. Optionally, a metal-elastic coupling 16 may be disposed in the drive unit 1 for attenuating torsional oscillations, for example a Geisinger coupling. FIG. 1 indicates two cross-sectional areas. The cross-section line II-II corresponds to the FIG. 2 representation. The cross-section line III-III represents the FIG. 3 representation.

FIG. 2 is a cross-sectional view of the drive unit 1 taken along line II-II of FIG. 1. It represents two different operating stages of the clutch 8. At the right of the symmetry line A, the clutch 8 is shown in the closed state and at the left of the symmetry line A, the clutch 8 is shown in the open state. The clutch 8 comprises two friction shoes 10, two centrifugal weights 11 and springs 12. The friction shoes 10, the centrifugal weights 11 and the springs 12 are connected for rotation with the output shaft 7. Each friction shoe 10 is rotatably supported by a shaft 17. Each centrifugal weight 11 is rotatably supported by a shaft 18. By way of the friction shoes 10, the frictional connection from the input shaft 5 to the output shaft 7 is established. The springs 12 press the friction shoes 10 in centripetal direction into engagement with the input shaft 5. Each centrifugal weight 11 is provided near the pivot axis 18 thereof with an actuating finger 13.

The clutch 8 operates as follows:

When the output shaft 7 is at a standstill the friction shoes 10 are held by the springs 12 in frictional engagement with the input shaft 5. The centrifugal weights 11 abut the respective friction shoe 10. This state is shown at the right side of FIG. 2. At a selectively determined speed range for examples at 300 to 500 rpm, the centrifugal weights 11 move radially outwardly as a result of the centrifugal forces generated at that speed. By the finger 13 of the centrifugal weight 11 a corresponding force is applied to the friction shoe 10 whereby the frictional engagement between the friction shoe 10 and the input shaft 5 is reduced. The clutch is then in a slipping state. Above a speed threshold of the output shaft 7, for example at 500 rpm, the centrifugal weights 11 are at their end position wherein the finger 13 lifts the respective friction shoe 10 completely off the input shaft 5. The clutch 8 is now fully disengaged. This state is shown in the left half of FIG. 2.

FIG. 3 is a cross-sectional view of the drive input taken along line III-III of FIG. 1. For a better explanation, a section is cutout. The reference numeral 9 indicates the free-wheeling coupling which in the present case is a clamping roller couplings disposed between the input shaft 5 and the metal elastic coupling 16. The stator 14 and the rotor 15 of the motor generator 6 are also shown. The free-wheeling coupling 9 is in the clamping state when the torque of the input shaft 5 is greater than the torque of the rotor 15 or, respectively, the inner part of the metal-elastic coupling 16. In the opposite situation when the torque of the rotor 15 is greater than the torque of the input shaft 5, the freewheeling coupling 9 is disengaged as the rollers are moved out of their clamping positions. When the clutch 8 is engaged the free-wheeling coupling 9 is also locked since both are arranged in parallel.

Figure 4:
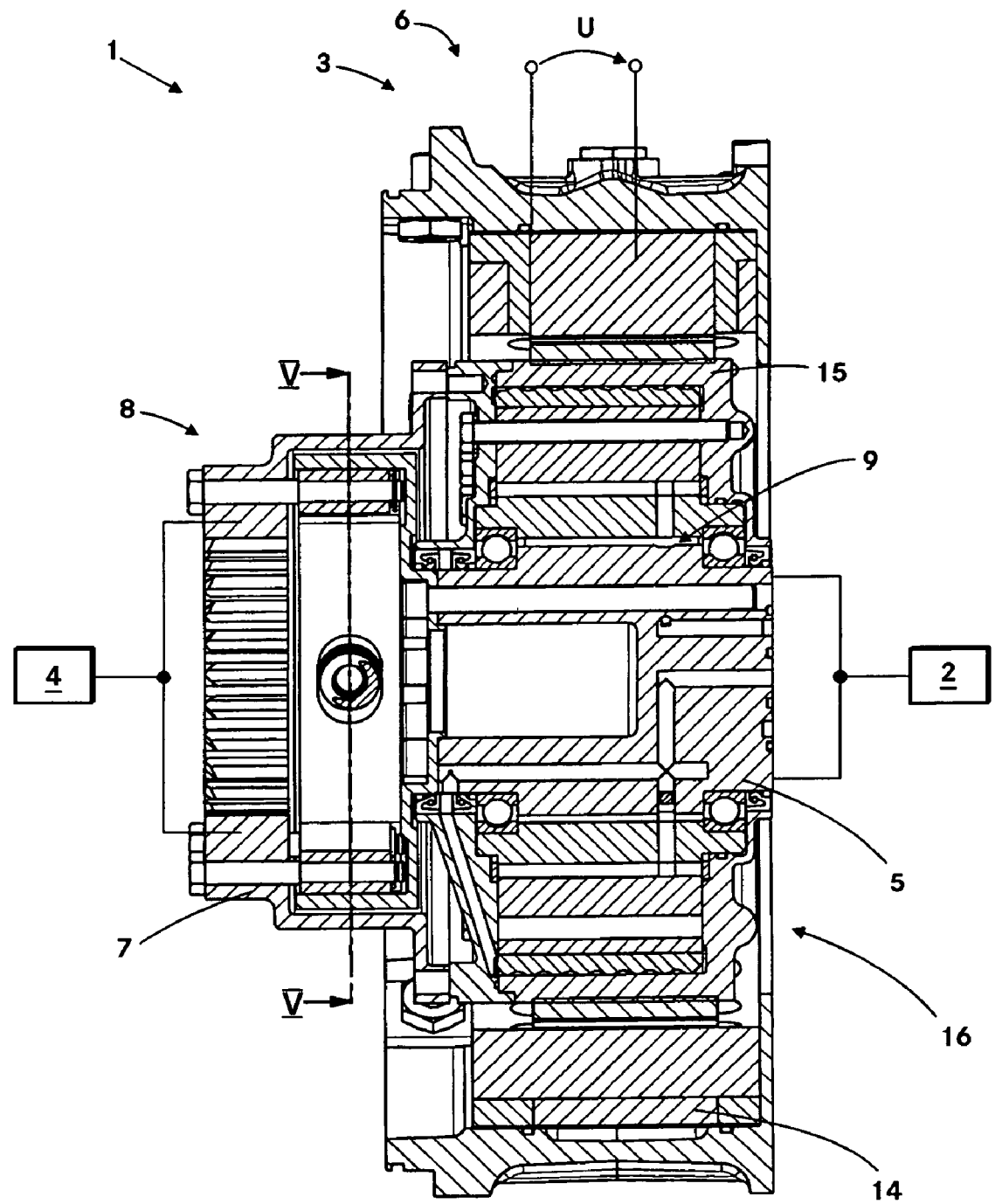
FIG. 4 is a cross-sectional view of a second embodiment.

FIG. 4 shows a second embodiment of the drive unit 1. In this embodiment, the clutch 8 is disposed within the input shaft 5. A more detailed description will be provided in connection with FIG. 5 which shows a cross-section taken along line V-V of FIG. 4. The drive unit 1 of the FIG. 4 includes the same components and functional arrangements as the drive unit of FIG. 1 so that the description of FIG. 1 also applies to FIG. 4.

Figure 5A:
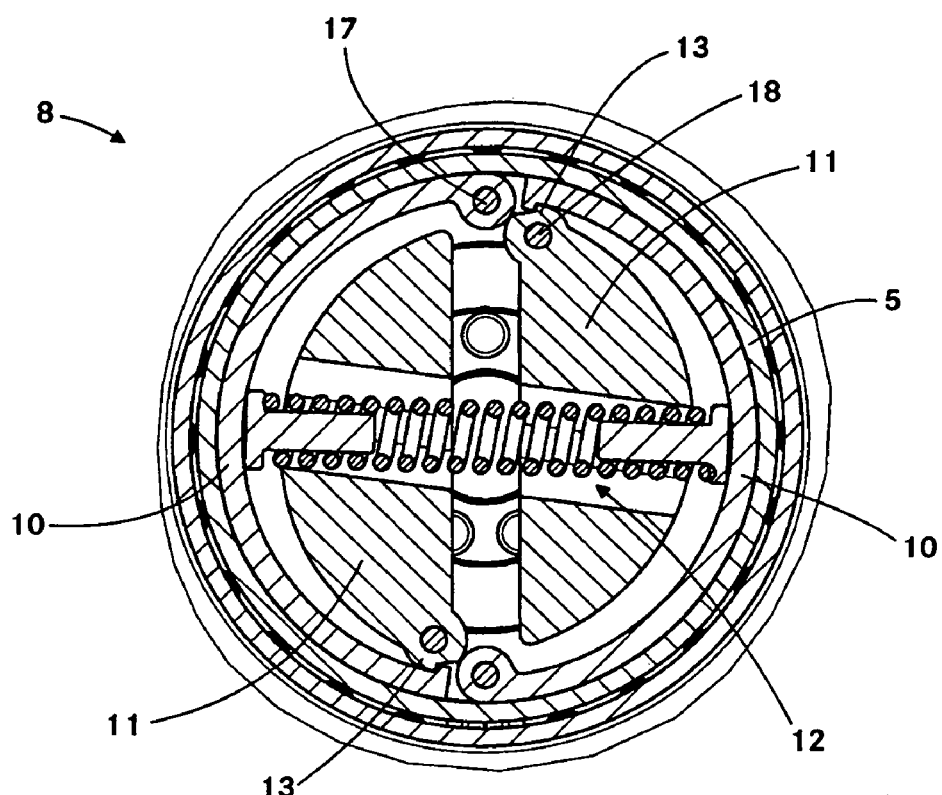
FIGS. 5A and 5B are cross-sectional views taken along line V-V of FIG. 4.
Figure 5B:
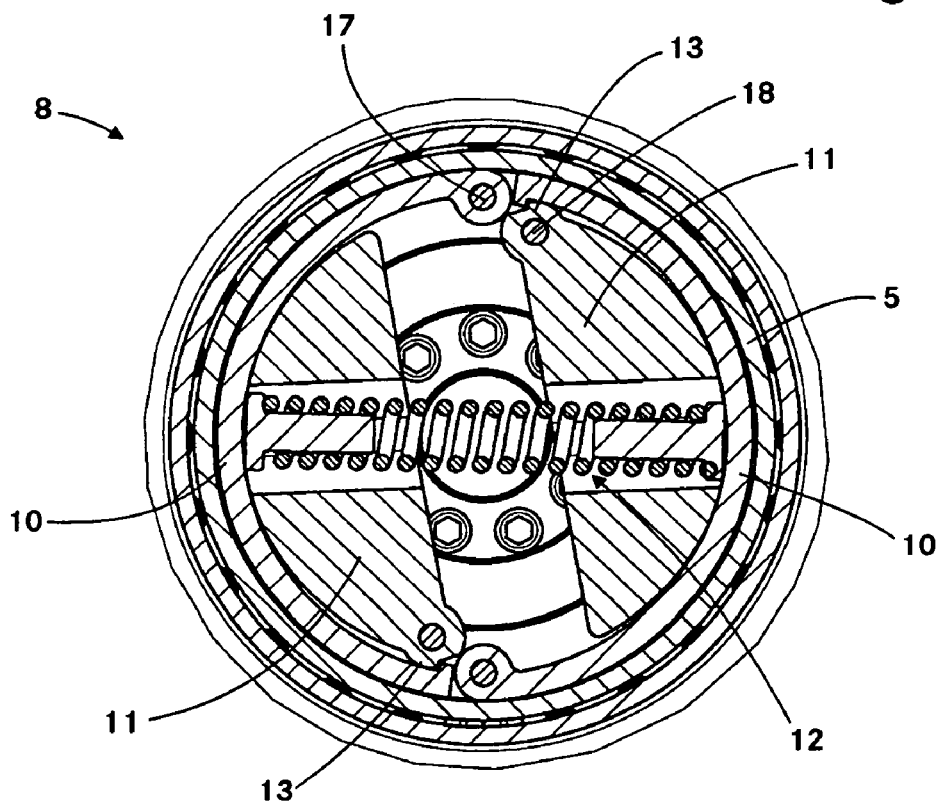

FIGS. 5A and 5B are cross-sectional views of the embodiment of FIG. 4 taken along line V-V of FIG. 4. FIG. 5A shows the clutch 8 in the closed state and FIG. 5B shows the clutch 8 open, that is, disengaged. In this embodiment, the clutch 8 is disposed within the input shaft 5. The clutch 8 comprises two friction shoes 10, two centrifugal weights 11 and at least one spring 12. The friction shoes 10 are supported so as to be pivotable about the shafts 17. The centrifugal weights 18 are rotatably supported by the shafts 18. The spring 12 biases the friction shoes 10 which are supported by the output shaft 7 outwardly into engagement with the input shaft 5. The friction shoes 10, the centrifugal weights 11 and the spring 12 are all associated with the output shaft 7, that is, these components rotate with the output shaft 7.

The clutch 8 operates as follows:

When the output shaft 7 is not rotating or rotating only slowly, the friction shoes 10 are held by the spring 12 in firm frictional engagement with the input shaft 5. The clutch 8 is then closed. With increasing speed of the output shaft 7, the centrifugal weights 11 are subjected to increasing centrifugal forces and as a result move radially outwardly about their pivot shafts 18. The fingers 13 of the centrifugal weights 11 engage the shoes 10 and lift them off the input shaft 5. As a result, the frictional engagement between the friction shoes 10 and the input shaft 5 is reduced. The clutch 8 at this point is in a slipping state. When the speed of the output shaft exceeds a certain threshold value, for example, 500 rpm, the friction shoes 10 are fully disengaged from the input shaft 5. The clutch is then open. There is no longer a frictional connection between the input shaft 5 and the output shaft 7.

The drive unit 1 of the FIGS. 1 to 5A and 5B provides for the following different modes of operation:

At standstill, the internal combustion engine 2 and the electrodynamic machine 3 are deactivated. The clutch 8 is closed, since the springs 12 hold the friction shoes 10 in frictional engagement with the input shaft 5.

For starting the engine, the stator 14 is energized by the voltage U. Because of the electromagnetic coupling the rotor 15 begins to rotate together with the output shaft 7 and the input shaft 5. The freewheeling coupling 9 is ineffective since it is bridged by the clutch 8 so that the internal combustion engine is also rotated. In a predetermined speed range of for example 300 to 500 rpm, the clutch 8 is in a slipping stage. Above about 500 rpm, the clutch 8 is fully open. With the injection of fuel into the combustion chamber of the internal combustion engine 2, the speed of the input shaft 5 is increased to the idle speed of the engine 2 of for example 700 rpm. In this state, the engine torque is transmitted from the input shaft 5 via the freewheeling coupling 9 to the rotor 15 and, respectively, the output shaft 7. The motor-generator 6 is de-energized at this point.

During operation with the internal combustion engine operating the clutch 8 is fully open so that no torque is transmitted via the clutch 8. The engine torque is transmitted to the output shaft 7 exclusively via the freewheeling coupling 9 or, optionally via the freewheeling coupling 9 to the metal-elastic coupling 16 and then to the output shaft 7.

The rotor 15 of the motor generator is always rotating with the output shaft 7 so that during downhill operation of the vehicle or slow down or for braking the vehicle, the motor-generator can be operated as a generator thereby producing electric energy for charging the batteries.

Upon transition from the vehicle operation by the internal combustion engine to an electromotor operation, the electrodynamic machine 3, that is the motor-generator is activated. As the speed of the rotor 15 is higher than the speed of the input shaft 5, the free-wheeling coupling is closed. The engine can then be de-activated. For restarting the engine out of the electromotor operation, the speed of the motor generator 3 first has to be reduced until the clutch 8 begins to close. By way of the engaging clutch 8, the torque of the rotor 15 is then transmitted to the input shaft 5 and to the internal combustion engine 2 for re-starting the engine.

With the drive unit 1 described, also a parallel operation of the electrodynamic machine 3 and the internal combustion engine 2 is possible. In this operating mode, the clutch 8 is open as the additional torque is supplied to the drive unit 1 at speeds above engine idle speed. The engine torque is thus transmitted only via the freewheeling coupling 9.

As apparent from the description, the following advantages are obtained by the invention:

The drive unit 1 includes only passive components for the control of the transitions between the different operating modes. No operating media are therefore needed so that the drive unit 1 is robust and operationally reliable The clutch 8 transmits only the torque required for starting the internal combustion engine so that the clutch requires little space and is subjected only to little wear. The engine torque for driving the vehicle is transmitted via the freewheeling coupling 9.

Standard components can be used for construction of the drive unit 1.

What is claimed is:

1. A drive unit (1) arranged between an engine (2) and a power transmission (4) of a hybrid motor vehicle for coupling at least one of an internal combustion engine (2) and an electrodynamic machine (3) in the form of a motor generator (6) to the power transmission (4), said drive unit (1) comprising an input shaft (5) which is connected to the internal combustion engine (2) for rotation therewith, and an output shaft (7) which is connected for rotation with the power transmission (4), said motor-generator (6) being connected to said output shaft (7) for rotation therewith and a clutch (8) arranged between said input shaft (5) and said output shaft (7) for coupling said engine to said output shaft (7), said clutch (8) including friction shoes (10) mounted so as to be rotatable with the output shaft (7) for the frictional engagement with the input shaft (5), spring means (12) for establishing the frictional engagement between the friction shoes (10) and the input shaft (5) and centrifugal weights (11) supported by said output shaft (7) and engaging said friction shoes (10) for lifting the friction shoes (10) out of their engagement with the input shaft (5) when the output shaft (7) reaches a predetermined speed, and a one-way coupling (9) arranged in said drive unit (1) in parallel with said clutch (8) for connecting the input shaft (5) to the output shaft (7) via the one-way coupling (9) for transmitting engine torque to said output shaft (7), said clutch (8) being disengaged during power operation of the internal combustion engine so that an engine power torque is transmitted to the output shaft (7) exclusively via the one-way coupling (9).

2. A drive unit according to claim 1, wherein the centrifugal weights (11) each include a finger (13) engaging a friction shoe (10) for moving the friction shoe (10) out of its engagement with the input shaft (5).

3. A drive unit according to claim 1, wherein the clutch (8) extends circumferentially around the input shaft (5) and the springs (12) are arranged so as apply a spring force to the friction shoes (10) in a centripetal direction.

4. A drive unit according to claim 1, wherein the clutch (8) is arranged within the input shaft (5) and the springs (12) are arranged so as to apply to the friction shoes a spring force effective in a radial outward direction.

5. A drive unit according to claim 1, wherein the motor-generator (6) includes & rotor (15) and the rotor (15) is rotatably supported on the input shaft via a metal-elastic support structure (16).

6. A drive unit according to claim 5, wherein the free wheeling coupling (9) is disposed between the input shaft (5) and the metal-elastic support structure (16).

\* \* \* \* \*